United States Patent
Hogg et al.

(10) Patent No.: US 12,494,489 B2
(45) Date of Patent: Dec. 9, 2025

(54) METHOD FOR PRODUCING AN ELECTRODE FOR A STORAGE DEVICE FOR STORING ELECTRICAL ENERGY, USE OF AN ELECTRODE OF THIS KIND, AND ELECTRODE

(71) Applicant: Bayerische Motoren Werke Aktiengesellschaft, Munich (DE)

(72) Inventors: Bjoern-Ingo Hieronymus Hogg, Munich (DE); Andreas Klein, Munich (DE); Rainer Stern, Ellwangen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 366 days.

(21) Appl. No.: 17/761,645

(22) PCT Filed: Sep. 29, 2020

(86) PCT No.: PCT/EP2020/077168
§ 371 (c)(1),
(2) Date: Mar. 18, 2022

(87) PCT Pub. No.: WO2021/078477
PCT Pub. Date: Apr. 29, 2021

(65) Prior Publication Data
US 2022/0393178 A1    Dec. 8, 2022

(30) Foreign Application Priority Data
Oct. 22, 2019    (DE) .................... 10 2019 128 445.7

(51) Int. Cl.
| | |
|---|---|
| *H01M 4/04* | (2006.01) |
| *H01M 4/62* | (2006.01) |
| *H01M 4/02* | (2006.01) |

(52) U.S. Cl.
CPC ......... *H01M 4/624* (2013.01); *H01M 4/0404* (2013.01); *H01M 4/0411* (2013.01); *H01M 2004/028* (2013.01)

(58) Field of Classification Search
CPC ...................................................... H01M 4/62
See application file for complete search history.

(56) References Cited

U.S. PATENT DOCUMENTS

| | | | | |
|---|---|---|---|---|
| 2012/0202114 A1* | 8/2012 | Madray | ............... | H01M 4/0435 264/105 |
| 2019/0088984 A1 | 3/2019 | Takami et al. | | |
| 2019/0198876 A1 | 6/2019 | Takami et al. | | |
| 2020/0044257 A1* | 2/2020 | Koo | ....................... | H01M 4/139 |

FOREIGN PATENT DOCUMENTS

| | | |
|---|---|---|
| CN | 110071266 A | 7/2019 |
| DE | 10 2016 217 386 A1 | 3/2018 |
| DE | 10 2017 217 656 A1 | 4/2019 |
| JP | 2002-260663 A | 9/2002 |
| JP | 2002-279994 A | 9/2002 |
| JP | 2017-130451    * | 7/2017 |

OTHER PUBLICATIONS

Machine translation.*
International Search Report (PCT/ISA/210) issued in PCT Application No. PCT/EP2020/077168 dated Dec. 8, 2020 with English translation (four (4) pages).
German-language Written Opinion (PCT/ISA/237) issued in PCT Application No. PCT/EP2020/077168 dated Dec. 8, 2020 (six (6) pages).
German-language Search Report issued in German Application No. 10 2019 128 445.7 dated Apr. 8, 2020 with partial English translation (11 pages).
Jabbour, Lara et al., "Elaboration of Li-Ion Batteries using cellulose fibers and papermaking techniques", Oct. 29, 2012, retrievable from the internet on Oct. 2, 2019 under the hyperlink "http://www.google.de/url?sa=t&rct=j&q=&esrc=s&source=web&cd=3&ved=2ahUKEwjGz_P4zZPhAhUNZVAKHZMUC_MQFjACegQIAxAC&url=http%3A%2F%2Fwww.theses.fr%2F2012GRENI043.pdf&usg=AOvVaw2E3-UgrowIKdrLlt4AawO8".
Chinese-language Office Action issued in Chinese Application No. 202080064530.6 dated Apr. 27, 2023 with English translation (11 pages).
Chinese-language Office Action issued in Chinese Application No. 202080064530.6 dated Sep. 11, 2023 with English translation (10 pages).
Chinese-language Office Action issued in Chinese Application No. 202080064530.6 dated Dec. 18, 2023 with English translation (13 pages).
Guorong et al., "Electrochemical Equipment and Engineering Design", China University of Mining and Technology Press, Mar. 31, 2018, pp. 143-144, (3 pages).
Chinese-language Office Action issued in Chinese Application No. 202080064530.6 dated Jun. 3, 2024 with English Translation (13 pages).

* cited by examiner

*Primary Examiner* — Austin Murata
(74) *Attorney, Agent, or Firm* — Crowell & Moring LLP

(57) ABSTRACT

A method for producing an electrode for a storage device for storing electrical energy is provided. A main body of the electrode is coated with at least one active material for storing electrical energy. A mixture, which includes the active material and fibers, is provided. The main body is coated with the mixture, which is free of a solvent that receives the fibers and escapes at least predominantly from the mixture after coating of the main body. By coating the main body with the mixture, a coating which includes the active material and the fibers is formed on the main body from the mixture.

12 Claims, 1 Drawing Sheet

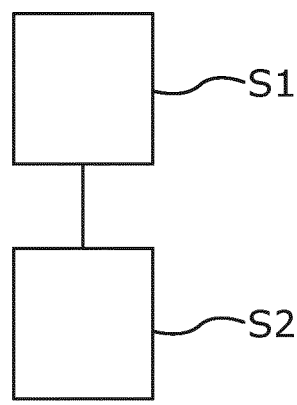
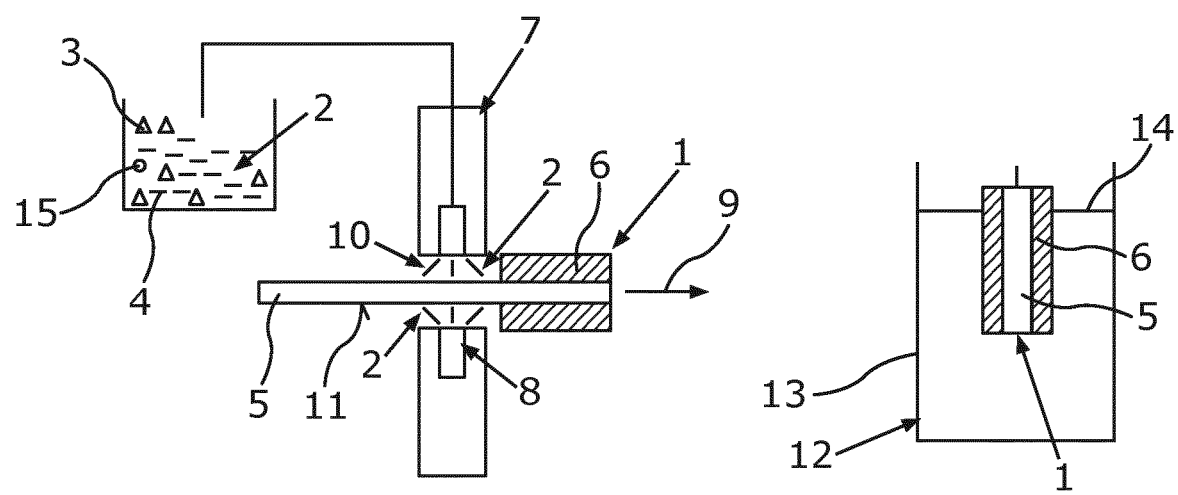
Fig.1
Fig.2

METHOD FOR PRODUCING AN ELECTRODE FOR A STORAGE DEVICE FOR STORING ELECTRICAL ENERGY, USE OF AN ELECTRODE OF THIS KIND, AND ELECTRODE

BACKGROUND AND SUMMARY OF THE INVENTION

The invention relates to a method for producing an electrode for a storage device for storing electrical energy, in particular for a motor vehicle, in which a main body of the electrode is coated with at least one active material for storing electrical energy. Furthermore, the invention relates to a use of an electrode of this kind, and to an electrode.

JP 2002279994 A discloses a battery having a negative electrode.

Furthermore, the publication "Elaboration of Li-Ion Batteries using cellulose fibres and papermaking techniques", Lara Jabbour et al., was retrievable from the internet on Oct. 2, 2019.

This publication discloses a method in which an aqueous pulp comprising graphite and microfibrillated cellulose as a solid phase is poured into a mold, whereupon the water is evaporated from the pulp. A porous film composed of the graphite and the microfibrillated cellulose is obtained as a result. This film is used for the preparation of an electrode for a lithium-ion battery.

It is an object of the present invention to provide a method for producing an electrode for a storage device for storing electrical energy, in particular for a motor vehicle, a use of an electrode of this kind, and an electrode of this kind, such that the electrode can be produced in a particularly advantageous way.

This object is achieved according to the claimed invention.

A first aspect of the invention relates to a method for producing an electrode for a storage device for storing electrical energy, in particular electric current, in particular for a motor vehicle. In the method, a main body of the electrode is coated with at least one active material for storing electrical energy. The active material can comprise lithium and/or graphite and/or nickel, for example, and is utilized in particular for storing the electrical energy by way of or in the storage device, in particular galvanically and/or electrostatically, the storage device being a galvanic element, for example. In particular, the storage device can be a battery, in particular a lithium-ion battery, or a storage cell, in particular a battery cell and in this case a lithium-ion cell, for example, such that the active material can comprise at least lithium, in particular. Furthermore, the active material is utilized for example for extracting from the storage device the electrical energy stored in or by way of the storage device, that is to say for taking the electrical energy away from the storage device and feeding it to at least one electrical consumer, for example.

Preferably, the main body is formed from a different material than the storage material. In particular, the main body can be formed from a metallic and/or electrically conductive material, in particular copper or aluminum. The main body is preferably a solid body, wherein the main body can be embodied as a film, in particular as a metal film, or as a metal sheet. In particular, the main body can be utilized as a current collector, which is also referred to as current tap or current tapping.

The storage device is used, in particular in the fully produced state of the storage device, for example in or for a motor vehicle embodied preferably as an automobile, in particular as a car, to store and provide the electrical energy that enables the motor vehicle to be driven electrically, in particular purely electrically. The motor vehicle is thus embodied for example as a hybrid or electric vehicle, in particular as a battery electric vehicle (BEV).

In order, then, to be able to produce the electrode and thus the storage device overall in a particularly advantageous way, the method according to an embodiment of the invention provides for a mixture to be provided, which mixture comprises the active material and fibers, embodied in particular separately from the active material. The mixture is thus preferably a heterogeneous mixture, in particular a heterogeneous substance mixture, comprising the fibers as first substance, in particular as first solid substance, and the active material as second substance, in particular as second solid substance.

Furthermore, the method according to an embodiment of the invention provides for the main body to be coated with the mixture, wherein the mixture is free of a solvent that takes up the fibers and that at least predominantly escapes from the mixture after the process of coating the main body. In other words, the mixture is solvent-free. This should be understood to mean, in particular, that the mixture comprises, includes or contains no solvent that takes up the fibers and that at least predominantly escapes or is taken away from the mixture after the process of coating the main body. As a result of coating the main body with the mixture, a coating comprising the active material and the fibers is formed, that is to say produced, on the main body from the mixture. Since the mixture—as described above or according to the definition mentioned above—is solvent-free, a removal of solvent from the mixture does not happen in the method. As a result, the electrode can be produced particularly cost-effectively and particularly favorably in respect of time expenditure.

One insight underlying the invention is, in particular, that N-methylpyrrolidone (NMP) is usually used as solvent for coatings, in particular for cathodes or positive poles for lithium-ion batteries. An embodiment of the invention now makes it possible to avoid NMP and to produce the electrode without NMP or without some other solvent that at least predominantly escapes from the mixture after the process of coating the main body with the mixture. Provision is usually made for pastes comprising NMP as solvent to be used for electrode coatings, in particular for cathode coatings. For anode coatings it is conceivable to use water as solvent. The use of water as solvent is not readily possible for cathode coatings on account of the stability of the active materials vis-à-vis water. A basic advantage of the use of a solvent that at least predominantly, in particular completely, escapes or is removed from the mixture after the process of coating the main body is that this results in an advantageous porosity of the coating or of the electrode. As a result of the porosity, the electrode or the coating has pores in which, in particular in the fully produced state of the storage device, a preferably liquid electrolyte can be taken up. In particular, the electrolyte can fill the pores, in particular completely, wherein an advantageous ionic conductivity can be realized by virtue of the fact that the pores take up the electrolyte. The porosity is produced in particular by virtue of the fact that after the process of coating the main body, the solvent is at least predominantly, in particular completely, removed, in particular in a targeted manner, from the mixture or from the coating, in particular by evaporation, that is to say by an evaporation process. This evaporation process follows the coating, that is to say follows a coating process, in the context of which the main body is coated with the mixture.

Solvent-free production of the electrode enables the electrode to be produced particularly cost-effectively and particularly favorably in respect of time expenditure since for example a drying or evaporation step, that is to say a work step by way of which the solvent is at least predominantly, in particular completely, removed from the mixture, can be avoided just like a step for recovering the solvent that has been at least predominantly removed from the mixture. Purification can be omitted as well. Moreover, the electrode can be produced in a particularly environmentally compatible way since unfavorable solvents in this regard such as NMP, in particular, can be dispensed with.

However, if a solvent that is at least predominantly removed from the mixture or from the coating after the process of coating the main body is now dispensed with, a porosity of the coating or of the electrode cannot be produced by evaporation, drying or removal of the solvent from the mixture. In this regard, however, an advantageous ionic conductivity can be ensured by use of the fibers, in particular in the fully produced state of the storage device.

In this case, it has been found to be particularly advantageous if after the process of coating the main body with the mixture, the coating is brought into contact with an, in particular liquid, electrolyte, which is at least partly taken up, in particular absorbed, by the fibers. In other words, instead of the pores described above, the fibers take up the electrolyte, in particular by virtue of the fibers absorbing at least a portion of the electrolyte. A particularly advantageous ionic conductivity can be ensured as a result.

In order to be able to produce the electrode particularly cost-effectively and particularly favorably in respect of time expenditure, a further configuration of the invention provides that before and after the process of coating the main body with the mixture, a process of coating the main body with a solvent does not happen. It has been found to be particularly advantageous furthermore if cellulose fibers are used as the fibers. A particularly advantageous ionic conductivity can accordingly be realized since, for example, the cellulose fibers can take up, in particular absorb, the, in particular liquid, electrolyte particularly well.

In a further configuration of the invention, the main body is coated with the mixture by extrusion. Accordingly, the main body can be coated and thereby provided with the mixture particularly simply, cost-effectively and favorably in respect of time expenditure. In the context of extrusion, the, in particular solid, main body is for example conveyed or driven, in particular pressed or pulled, through an opening, in particular through a die. While the main body is being conveyed through the opening, the main body, in particular within the opening, is coated with the mixture, in particular in such a way that the mixture is deposited, in particular applied, on the main body, in particular on an outer circumferential lateral surface of the main body, while the main body is being conveyed through the opening. Alternatively or additionally, upstream of the opening and/or downstream of the opening, the mixture is deposited onto the main body, in particular onto the outer circumferential lateral surface, while the main body is being conveyed through the opening. An advantageous outer circumferential shape of the electrode or of a component which comprises the main body coated with the mixture can be created by the extrusion for example simply, cost-effectively and favorably in respect of time expenditure. In particular, the shape can be produced by wall regions delimiting the opening, in particular along the circumferential direction thereof.

In order to deposit, in particular to apply, the mixture on the main body, in particular onto the outer circumferential lateral surface, at least one application mechanism is used, for example, which can comprise a die, in particular a slot die. By way of example, the mixture streams or flows through the die and is sprayed out by way of the die and sprayed against the main body, in particular against the outer circumferential lateral surface, and is thereby deposited or applied onto the main body, in particular onto the outer circumferential lateral surface.

It has been found to be particularly advantageous furthermore if the main body is coated with the mixture by lamination. In the course of lamination, for example, the mixture or the coating is joined to the main body thermally and/or cohesively. Lamination thus comprises a thermal and/or cohesive joining method, for example, by way of which the mixture or the coating is thermally and/or cohesively bonded to the main body using heat. For this purpose, for example, the main body and/or the mixture are/is heated, in particular in such a way that the mixture is deposited onto the main body, in particular onto the outer circumferential lateral surface, in a hot or heated state of the main body and/or in a hot or heated state of the mixture, as a result of which for example the mixture or the coating is thermally and/or cohesively bonded to the main body.

In order to be able to produce the electrode particularly simply and cost-effectively, a further configuration of the invention provides for the fibers to be electrically conductive. This embodiment is based on the concept that the fibers can perform at least one further or additional function. For example, further conductive additives for an electrical conductivity such as carbon black or carbon nanotubes, for example, can be dispensed with if the fibers are electrically conductive. A further functionalization of the fibers and/or at least one property of the fibers can also be utilized for realizing a particularly high safety of the storage device embodied for example as a cell, in particular as a battery cell.

In this regard, it has been found to be particularly advantageous if the fibers are formed from a non-combustible material or material of low flammability. In other words, the fibers have fire-inhibitory properties. The feature that the fibers are formed from a non-combustible material should be understood to mean, in particular, that the fibers are non-combustible and without combustible constituents or non-combustible with combustible constituents, such that the fibers are for example in class A1 or A2 s1, d0 in accordance with the standard EN 13501 1, which defines classes concerning combustion behavior, or the fibers are for example in the building material class A1 or A2 in accordance with the standard DIN 4102 1, which defines building material classes. The feature that the fibers are formed from a material of low flammability can be understood to mean, in particular, that the fibers are for example in class B, C s1, d0 or A2, B, C s2, d0 or A2, B, C s3, d0 or A2, B, C s1, d1 or A2, B, C s1, d2 or A2, B, C s3, d2 in accordance with the standard EN 13501 1, which defines classes concerning fire behavior, or the fibers are for example in the building material class B1 in accordance with the standard DIN 4102 1, which defines building material classes. Insofar as reference is made to the standards EN 13501 1 and DIN 4102 1 in the context of this disclosure, they should be understood to be the standards EN 13501 1 and DIN 4102 1 in their version valid on Oct. 9, 2019.

Alternatively or additionally, it is conceivable for the fibers to have a particularly high thermal conductivity, as a result of which a particularly high thermal conductivity of the electrode can be realized on the basis of the fibers particularly simply and cost-effectively.

Finally, it has been found to be particularly advantageous if the mixture also comprises a binder provided in addition to the fibers and in addition to the active material, which binder takes up the fibers and/or the active material, for example. In other words, the fibers and/or the active material can be embedded in the binder. The binder provides for an advantageous cohesion of the fibers and the active material and, for example, for a particularly advantageous adhesion of the mixture to the main body.

Preferably, a polymer, in particular polyvinylidene fluoride (PVdF), is used as the binder.

A second aspect of the invention relates to the use of an electrode produced by way of a method in accordance with the first aspect of the invention, wherein the electrode is used for an, in particular positive, electrical pole of a or the storage device for storing electrical energy. The positive electrical pole is also referred to as positive pole or electrical positive pole and, for example, during discharge of the storage device, is the cathode thereof. Discharge should be understood to mean that the electrical energy stored in or by way of the storage device is taken away from or out of the storage device and fed to an electrical consumer, for example. Advantages and advantageous configurations of the first aspect of the invention should be regarded as advantages and advantageous configurations of the second aspect of the invention, and vice versa. The invention is intended also to include the use of a or the electrode produced by way of a method in accordance with the first aspect of the invention, wherein the electrode is used in a or the abovementioned storage device of a motor vehicle and thus in or for the motor vehicle. Electrical energy can be stored by way of or in the storage device, which electrical energy for example is utilized or is utilizable for driving the motor vehicle electrically, in particular purely electrically. In this case, for example, the abovementioned consumer is an electrical machine which, by virtue of the electrical machine being supplied with the electrical energy stored in the storage device, is operated or is operable in a motor operating mode and thus as an electric motor. By way of the electric motor, the motor vehicle is driven electrically, in particular purely electrically.

A third aspect of the invention relates to an electrode for a storage device for storing electrical energy, in particular for a motor vehicle. In this case, the electrode is produced by way of a method in accordance with the first aspect of the invention. Advantages and advantageous configurations of the first aspect and of the second aspect of the invention should be regarded as advantages and advantageous configurations of the third aspect of the invention, and vice versa.

Further details of the invention are evident from the following description of a preferred exemplary embodiment together with the associated drawings.

BRIEF DESCRIPTION OF THE DRAWINGS

FIG. 1 shows a flow diagram for elucidating a method according to the invention for producing an electrode for a storage device for storing electrical energy, in particular for a motor vehicle.

FIG. 2 shows a schematic illustration of the method.

DETAILED DESCRIPTION OF THE DRAWINGS

In the figures, identical or functionally identical elements are provided with identical reference signs.

A method for producing an electrode 1 for a storage device for storing electrical energy, in particular electric current, is described below with reference to FIGS. 1 and 2. The storage device is used to store the electrical energy for a motor vehicle embodied for example as an automobile, in particular as a car. The storage device is thus used in or for a motor vehicle, such that the motor vehicle, in its fully produced state, comprises the storage device and the electrode 1. The motor vehicle is a hybrid or electric vehicle, in particular a battery electric vehicle, such that the motor vehicle comprises at least one electrical machine. The motor vehicle can be driven electrically, in particular purely electrically, by way of the electrical machine. For this purpose, the electrical machine is operated in a motor operating mode and thus as an electric motor. In order to operate the electrical machine in the motor operating mode, the electrical machine is supplied with the electrical energy, in particular with the electric current, which is stored in the storage device. In order to be able to realize particularly high electrical powers for driving the motor vehicle electrically, in particular purely electrically, the storage device and the electrical machine are preferably embodied as high-voltage components, the respective electrical voltage, in particular electrical operating or rated voltage, of which is preferably greater than 50 volts, in particular greater than 60 volts, or is preferably hundreds of volts. The storage device is embodied for example as a battery, in particular as a high-voltage battery. In particular, the storage device can be embodied as a lithium-ion battery. The storage device comprises for example a plurality of cells electrically connected to one another, which are also referred to as storage cells and are embodied as lithium-ion cells, for example. In this case, the electrode 1 is for example an electrode of one of the storage cells. The electrode 1 is for example part of a positive electrical pole—also referred to as positive pole—of the storage cell or of the storage device, such that, for example, relative to discharge of the storage device or of the storage cell, the electrode 1 is a cathode of the storage device or of the storage cell. During discharge of the storage device or of the storage cell, the electrical energy stored in the storage device or in the storage cell is taken away from the storage cell or from the storage device and fed to the electrical machine, for example. In this case, the storage device or the storage cell is in particular a galvanic element.

A first step S1 of the method involves providing a mixture 2 comprising at least one active material and fibers provided in addition to the active material, which mixture is illustrated particularly schematically in FIG. 2. In FIG. 2, the active material is represented particularly schematically by triangles and designated by 3, while the fibers are likewise represented particularly schematically by lines and are designated by 4. The fibers 4 are preferably solid and thus a first solid substance. Alternatively or additionally, the active material 3 is solid and thus for example a second solid substance of the mixture 2. A second step S2 of the method involves coating a main body 5 of the electrode 1 with the mixture 2 and hence with the active material 3 and with the fibers 4, wherein, in particular before the process of coating, after the process of coating and during the process of coating the main body 5, the mixture 2 is free of a solvent that at least predominantly escapes from the mixture 2 after the process of coating the main body 5. Consequently, the situation in which a solvent at least predominantly escapes from the mixture 2 after the process of coating the main body 5 with the mixture 2 does not happen in the method. As a result of coating the main body 5 with the mixture 2, a coating 6 of the electrode 1, which coating comprises the active material 3 and the fibers 4, is formed on the main body 5 from the mixture 2. The finished produced electrode 1 is thus a component which comprises the main body 5 and the coating 6 comprising the active material 3 and the fibers 4, which coating is deposited on the main body 5 and in particular adheres to the main body 5. In this case, the main body 5 is preferably formed from a metallic and/or electrically conductive material such as copper or aluminum, for example.

A coating device 7, also referred to as an application mechanism, is used to coat the main body 5 with the mixture 2. The coating device 7 comprises at least one, in particular ring-shaped, opening 8, which for example is embodied as a die or is part of such a die. The main body 5, which is preferably solid and thus embodied as a solid body, is conveyed, in particular at least substantially continuously, in a conveying direction, illustrated by an arrow 9 in FIG. 2, through an opening 10 of the coating device 7, which opening is preferably embodied as a through opening. In this case, the opening 8 joins the opening 10 and the mixture 2 flows through it, such that the coating device 7 sprays out the mixture 2 via the opening 8 and sprays it against the main body 5, in particular sprays against an outer circumferential lateral surface 11 of the main body 5, while the main body 5 is being conveyed along the conveying direction through the opening 10 and thus through the coating device 7. Accordingly the mixture 2 is deposited or applied onto the main body 5, in particular onto the outer circumferential lateral surface 11, as a result of which the coating 6 is formed, that is to say produced, on the outer circumferential lateral surface 11.

In FIG. 2 the storage cell, too, is illustrated schematically and is designated by 12, the storage cell 12 in its finished produced state having the electrode 1. In its fully produced state, the storage cell 12 furthermore comprises a cell housing 13 accommodating an, in particular liquid, electrolyte 14. After the process of coating the main body 5 with the mixture 2, the electrode 1 is arranged in the housing 13 and in this case is brought into contact with the electrolyte 14, in particular dipped into the electrolyte 14. This is effected for example in such a way that the electrode 1 is moved into the housing 13 while the electrolyte 14 is already situated in the housing 13, or it can be provided that firstly the electrode 1 is at least partly arranged in the cell housing 13 and afterward the electrolyte 14 is introduced into the cell housing 13. As a consequence, the coating 6 comes into, in particular direct, contact with the electrolyte 14, the fibers 4 of the coating 6 taking up, in particular absorbing, at least a portion of the electrolyte 14. Furthermore, the electrode 1—before it is introduced into the housing 13—can be brought into contact with the electrolyte 14. The electrode 1 impregnated with the electrolyte 14 is then introduced into the housing 13. In other words, the fibers 4 are impregnated with the electrolyte 14. A particularly advantageous ionic conductivity of the electrode 1 or of the storage cell 12 can be ensured as a result.

It is discernible from FIG. 2 that the main body 5 is coated with the mixture 2 by extrusion, for example. Furthermore, it is conceivable for the main body to be coated with the mixture 2 by lamination. In the context of lamination, for example, the mixture 2 or the coating 6 is thermally and cohesively attached to the main body 5, that is to say bonded to the main body 5. Preferably, the mixture 2 also comprises a binder 15, which is represented particularly schematically by circles in FIG. 2 and which can comprise at least or exactly one polymer, in particular polyvinyl fluoride.

It is discernible overall that the fibers function as small sponges that take up the electrolyte 14. Accordingly, a solvent-free production process for producing the electrode 1 can be realized, wherein a sufficient ionic conductivity of the electrode 1 can simultaneously be ensured. Such a solvent-free production process generally results in an electrode having a very low or no porosity. However, since the fibers 4 take up the electrolyte 14, it is possible to ensure a sufficient uptake capacity of the electrode 1 with regard to taking up the electrolyte 14, such that an advantageous ionic conductivity can be ensured.

Since the mixture 2 does not comprise a solvent that at least predominantly escapes from the mixture 2 after the process of coating the main body 5 with the mixture 2, the mixture 2 is as it were solvent-free. As a result, complicated work steps such as, for example, drying or filtration for at least predominantly removing a solvent from the mixture 2 can be avoided, such that the electrode 1 can be produced particularly cost-effectively and particularly favorably in respect of time expenditure.

LIST OF REFERENCE SIGNS

1 Electrode
2 Mixture
3 Active material
4 Fiber
5 Main body
5 Coating
7 Coating device
8 Opening
9 Arrow
10 Opening
11 Outer circumferential lateral surface
12 Storage cell
13 Cell housing
14 Electrolyte
S1 First step
  S2 Second step

What is claimed is:

1. A method for producing an electrode for a storage device for storing electrical energy, in which a main body of the electrode is coated with at least one active material for storing electrical energy, the method comprising:
    providing a mixture comprising the active material and fibers; and
    coating the main body with the mixture, which is free of a solvent that takes up the fibers and that at least predominantly escapes from the mixture after coating the main body, wherein as a result of coating the main body with the mixture, a coating comprising the active material and the fibers is formed on the main body from the mixture,
    wherein the main body is coated with the mixture by extrusion.

2. The method according to claim 1,
    wherein after coating the main body with the mixture, the coating is brought into contact with an electrolyte, which is at least partly taken up by the fibers.

3. The method according to claim 2, wherein the electrolyte is a liquid.

4. The method according to claim 2, wherein the electrolyte is at least partly absorbed by the fibers.

5. The method according to claim 1,
    wherein before and after coating the main body with the mixture, a process of coating the main body with a solvent does not occur.

6. The method according to claim 1,
wherein cellulose fibers are used as the fibers.

7. The method according to claim 1,
wherein the main body is coated with the mixture by lamination.

8. The method according to claim 1,
wherein the fibers are electrically conductive.

9. The method according to claim 1,
wherein the fibers are formed from a non-combustible material or a material of low flammability.

10. The method according to claim 1,
wherein the mixture further comprises a binder.

11. The method of claim 1, further comprising using the electrode for an electrical pole of a storage device for storing electrical energy.

12. The method of claim 11, wherein the electrical pole is positive.

* * * * *